US 6,716,911 B2
Apr. 6, 2004

(12) United States Patent
Doi et al.

(10) Patent No.: US 6,716,911 B2
(45) Date of Patent: Apr. 6, 2004

(54) METHOD FOR PRODUCING AQUEOUS BIODEGRADABLE POLYESTER DISPERSION

(75) Inventors: Yukio Doi, Hyogo (JP); Ryoji Ishioka, Kanagawa (JP); Yoshiro Okino, Saitama (JP); Mitsuhiro Imaizumi, Kanagawa (JP)

(73) Assignee: Showa Highpolymer Co., Ltd., Tokyo (JP)

( * ) Notice: Subject to any disclaimer, the term of this patent is extended or adjusted under 35 U.S.C. 154(b) by 0 days.

(21) Appl. No.: 10/311,070

(22) PCT Filed: Jun. 15, 2001

(86) PCT No.: PCT/JP01/05140
§ 371 (c)(1),
(2), (4) Date: Dec. 13, 2002

(87) PCT Pub. No.: WO01/96449
PCT Pub. Date: Dec. 20, 2001

(65) Prior Publication Data
US 2003/0181630 A1 Sep. 25, 2003

(30) Foreign Application Priority Data
Jun. 16, 2000 (JP) ........................................ 2000-181574

(51) Int. Cl.[7] .............................. C08L 2/32; C08F 20/00

(52) U.S. Cl. ........................ 524/801; 525/437; 525/440; 525/446; 524/803; 524/806

(58) Field of Search ................................. 525/437, 440, 525/446; 524/801, 803, 806

(56) References Cited

FOREIGN PATENT DOCUMENTS

| JP | 11-092712 | * | 4/1999 |
| JP | 2000-007789 | * | 1/2000 |
| JP | 2001-011294 | * | 1/2001 |
| WO | WO 98/29477 | * | 7/1998 |

* cited by examiner

*Primary Examiner*—Samuel A. Acquah
(74) *Attorney, Agent, or Firm*—Sughrue Mion, PLLC

(57) ABSTRACT

The invention provides a method for producing an aqueous biodegradable polyester dispersion and includes the step of mixing and kneading a molten biodegradable polyester, an aqueous emulsifier solution having a surface tension in terms of 1.0% by weight aqueous solution at 20° C. of 63 mN/m or less, and other additives according to necessity to yield an aqueous dispersion having a solid concentration of 40% by weight or more and a viscosity at 20° C. of 1000 mPa·s or more. The invention can provide a method for producing an aqueous biodegradable polyester dispersion that has a high solid concentration and a high viscosity and is very advantageous in practical use.

13 Claims, No Drawings

METHOD FOR PRODUCING AQUEOUS BIODEGRADABLE POLYESTER DISPERSION

TECHNICAL FIELD

The present invention relates to a method for producing an aqueous biodegradable polyester dispersion.

BACKGROUND ART

Aqueous resin dispersions have many advantages meeting current requirements such as easy handling property and safety for operators and operation environment as compared with resin solutions in solvents and are in wide use. However, most of these aqueous resin dispersions are not biodegradable, except rubber latices, and thus put a certain load on the environment when they are discarded.

Very few aqueous dispersions (hereinafter referred to as emulsions) of biodegradable resins are disclosed or reported in patent applications and scientific reports, and most of them are aliphatic polyesters or starch derivatives. These aqueous dispersions must have a high solid concentration or a high viscosity for practical use. However, these conventional aqueous dispersions of biodegradable resins give almost no consideration to these points. For example, regarding the solid concentration by weight (hereinafter referred to "solid concentration"), disclosed are a polyhydroxyalkanoate emulsion having a solid concentration of 2.5% by weight (hereinafter simply referred to as %) (PCT International Publication No. WO97/04036), a starch derivative emulsion having a solid concentration of 18% to 28.2% (Japanese Unexamined Patent Application Publication No. 9-77910), a polycaprolactone emulsion having a solid concentration of 14.5% to 22.1% (Japanese Unexamined Patent Application Publication No. 8-81634), and an aliphatic polyester emulsion having a solid concentration of 19.3% to 32.0% (Japanese Unexamined Patent Application Publication No. 11-92712). These documents fail to describe viscosities of these emulsions.

The emulsions of biodegradable resins in the documents are produced by dissolving a solid resin in a solvent to yield a solution, and mixing and stirring the solution with an aqueous emulsifier solution (solution phase-inversion emulsification).

Accordingly, it is an object of the present invention to provide a method for producing an aqueous biodegradable polyester dispersion that has a high solid concentration and a high viscosity and is very advantageous in practical use.

SUMMARY OF INVENTION (1) The present invention provides a method for producing an aqueous biodegradable polyester dispersion, the method comprising the step of mixing and kneading a molten biodegradable polyester, an aqueous emulsifier solution having a surface tension in terms of 1.0% by weight aqueous solution at 20° C. of less than or equal to 63 mN/m, and other additives according to necessity to thereby yield an aqueous dispersion having a solid concentration of equal to or more than 40% by weight and a viscosity at 20° C. of equal to or more than 1000 mPa·s.

(2) In the method for producing an aqueous biodegradable polyester dispersion according to (1), the ratio $\eta_O/\eta_W$ of the viscosity $\eta_O$ of the molten biodegradable polyester to the viscosity $\eta_W$ of the aqueous emulsifier solution may be less than or equal to 150.

(3) In the method for producing an aqueous biodegradable polyester dispersion according to (1) or (2), the biodegradable polyester may have the following constitutional repeating unit:

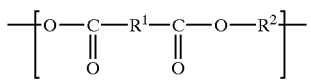

Chemical Formula (1)

wherein $R^1$ and $R^2$ are each an alkylene group containing 2 to 10 carbon atoms or an alicyclic hydrocarbon group containing 5 or 6 carbon atoms.

(4) In the method for producing an aqueous biodegradable polyester dispersion according to (1) or (2); the biodegradable polyester may structurally comprise the constitutional repeating unit described in (3) being combined through at least the following unit:

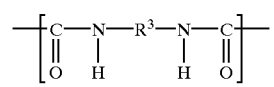

Chemical Formula (2)

wherein $R^3$ is a diisocyanate residue, and/or the following unit:

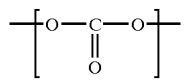

Chemical Formula (3)

(5) In the method for producing an aqueous biodegradable polyester dispersion according to (1) or (2), the biodegradable polyester may structurally comprise the constitutional repeating unit described in (3) being combined through at least the following unit:

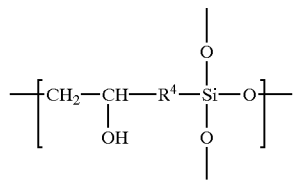

Chemical Formula (4)

and/or the following unit:

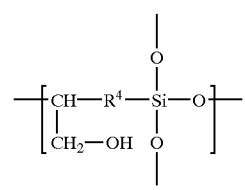

Chemical Formula (5)

and/or
the following unit:

Chemical Formula (6)

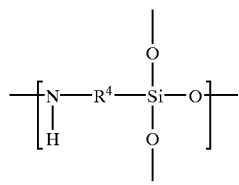

wherein $R^4$ is an alkylene group containing 2 to 6 carbon atoms.

(6) In the method for producing an aqueous biodegradable polyester dispersion according to (1) or (2), the biodegradable polyester may have the following constitutional repeating unit:

Chemical Formula (7)

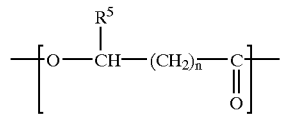

wherein $R^5$ is a hydrogen, an alkyl group containing 1 to 19 carbon atoms, or an alkenyl group containing 1 to 19 carbon atoms; and n is a number from 1 to about 4.

(7) In the method for producing an aqueous biodegradable polyester dispersion according to (1) or (2), the biodegradable polyester may structurally comprise the constitutional repeating unit described in (6) being combined through at least the following unit:

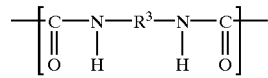

wherein $R^3$ is a diisocyanate residue,
and/or
the following unit:

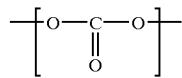

(8) In the method for producing an aqueous biodegradable polyester dispersion according to (1) or (2), the biodegradable polyester may structurally comprise the constitutional repeating unit described in (6) being combined through at least the following unit:

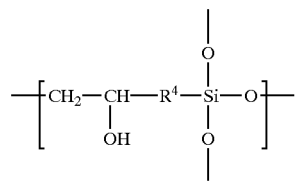

and/or
the following unit

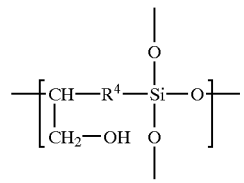

and/or
the following unit:

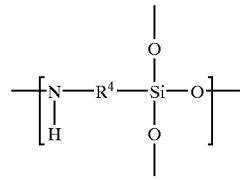

wherein $R^4$ is an alkylene group containing 2 to 6 carbon atoms.

(9) In the method for producing an aqueous biodegradable polyester dispersion according to any one of (1) to (8), the emulsifier may be a poly(vinyl alcohol) or a nonionic surfactant having a polyoxyethylene chain.

(10) In the method for producing an aqueous biodegradable polyester dispersion according to any one of (1) to (9), a peak particle size may be less than or equal to 3 µm where the peak particle size is the diameter at a peak in a particle size distribution curve.

(11) In the method for producing an aqueous biodegradable polyester dispersion according to (10), the step of mixing and kneading may be performed using a screw extruder.

(12) In the method for producing an aqueous biodegradable polyester dispersion according to (11), the screw extruder may be a corotating twin-screw extruder or a grinder extruder.

(13) In the method for producing an aqueous biodegradable polyester dispersion according to (11) or (12), the aqueous emulsifier solution may be supplied separately at two or more points of the screw extruder.

Japanese Unexamined Patent Application Publication No. 56-2149 discloses a process of melting a resin and mixing the molten resin with an aqueous emulsifier solution (melt emulsification), and Japanese Unexamined Patent Application Publication No. 4-20532 discloses a process of mixing a molten mixture of a resin and an emulsifier with water. These techniques are intended to yield polyolefin resin emulsions and are irrelevant to aqueous dispersions of biodegradable polyesters, the subject matter of the present invention. Specifically, such biodegradable polyesters are different from the polyolefin resins in physical properties, particularly in surface-chemical properties with respect to water, which are important for emulsification. In addition, the biodegradable polyesters are generally more susceptible to hydrolysis than the polyolefin resins. No report has been made on the application of melt emulsification to biodegradable polyesters.

DISCLOSURE OF INVENTION

The present invention will be illustrated in further detail below. The terms "biodegradability" and "being biodegradable" used herein mean a property of being decomposed by microorganisms in soil or water in a natural environment ultimately into, for example, carbon dioxide gas and water.

Such biodegradable polyesters for use in the present invention include, for example, polyesters having a constitutional repeating unit represented by Chemical Formula (1);

biodegradable polyesters having the constitutional repeating unit of Chemical Formula (1) combined through a unit represented by Chemical Formula (2) and/or a unit represented by Chemical Formula (3) and/or a unit represented by Chemical Formula (4) and/or a unit represented by Chemical Formula (5) and/or a unit represented by Chemical Formula (6); and polyesters having a constitutional repeating unit represented by Chemical Formula (7).

Examples of such biodegradable polyesters further include polyesters each having both the constitutional repeating units of Chemical Formulae (1) and (7), and the polyesters just mentioned above further having at least one of the units of Chemical Formulae (2) through (6). In addition, random and/or block copolymers and blends of these polyesters are also useful.

More specifically, examples of the biodegradable polyesters having any one of the units of Chemical Formulae (1) through (6) are poly(butylene succinate), poly(butylene succinate adipate), poly(ethylene succinate), poly(ethylene succinate adipate), and reaction products prepared by combining these polyesters with hexamethylene diisocyanate or γ-aminopropyltrimethoxysilane.

Examples of the biodegradable polyesters having the constitutional repeating unit of Chemical Formula (7) include polycaprolactone, poly(lactic acid), poly(glycolic acid), as well as polyhydroxybutyrate-polyhydroxyvalerate copolymers, and other polyhydroxyalkanoates produced by microorganisms.

The biodegradable polyesters may further includes another structure than the aforementioned structures within ranges not deteriorating their biodegradability. Examples of such biodegradable polyesters are poly(butylene succinate) prepared by introducing 25% or less of a reaction product of dehydration condensation of ethylene glycol and terephthalic acid into the constitutional repeating unit, and poly(butylene succinate terephthalate) and poly(ethylene succinate terephthalate) each containing less than or equal to 40% by mole of a terephthalate constitutional repeating unit.

Emulsifiers for use in present invention should have a surface tension in terms of 1% aqueous solution at 20° C. of less than or equal to 63 mN/m, preferably less than or equal to 60 mN/m, and more preferably less than or equal to 55 mN/m. If the surface tension exceeds 63 mN/m, constitutive particles of the resulting emulsion may not be sufficiently divided and thus invite coarse particles on the order of several millimeters, or a solid phase and an aqueous phase are separated to thereby fail to yield a stable emulsion.

The emulsifiers include, for example, surfactants such as sodium lauryl sulfate, sodium oleate, and other anionic surfactants comprising an aliphatic acid salt containing 4 to 18 carbon atoms; lauryl trimethylammonium chloride and other cationic surfactants; N-lauryl glycine and other ampholytic surfactants; and polyoxyethylene nonylphenyl ether and other nonionic surfactants. Such nonionic surfactants also include those used as food additives such as glycerin fatty acid esters, sucrose fatty acid esters, sorbitan fatty acid esters, propylene glycol fatty acid esters, lecithin, and their ethylene oxide adducts.

The emulsifiers also include water-soluble macromolecular substances such as starch, casein, and gelatin, as well as those used as food additives for thickening such as alginic acid, alginates, Locust bean gum, guar gum, gum arabic, xanthan gum, agar, carrageenan, crystalline cellulose, pectin, and other naturally-occurring macromolecular substances; hydroxyethylcellulose, methylcellulose, carboxymethyl cellulose, propylene glycol arginate, cationic modified starch, and other semisynthetic macromolecular substances; poly(vinyl alcohol), polyacrylamides, poly(vinyl pyrrolidone), poly(acrylic acid), polyvinylpyridine, poly(ethylene imine), as well as copolymers or modified products of these polymers to have an anionic, cationic, or hydrophobic constitutional unit; copolymers of vinyl monomers such as acrylic esters, methacrylic ester and styrene with acidic monomers such as acrylic acid, methacrylic acid and malic anhydride, with basic monomers such as vinylpyridine and dimethylaminoethyl methacrylate, or with hydroxyl-group-containing monomers such as hydroxyethyl acrylate, and hydroxyethyl methacrylate; and biodegradable polyesters modified with succinic anhydride, maleic anhydride, or polyethylene oxide, and other synthetic macromolecular substances.

Surface acting substances other than the above substances can be additionally used within ranges not deteriorating the biodegradability of the resulting aqueous biodegradable polyester dispersion.

For satisfactory biodegradability, preferred emulsifiers include partially saponified poly(vinyl alcohol)s inclusive of acetic acid group built-up type; partially saponified poly(vinyl alcohol)s having a sulfonic group, carboxyl group or amino group; and water-soluble biodegradable polyesters having a carboxyl group or polyoxyethylene residue. Among them, poly(vinyl alcohol)s and nonionic surfactants having a polyoxyethylene chain are typically preferred.

The ratio $\eta_O/\eta_W$ of the viscosity of the molten biodegradable polyester $\eta_O$ to the viscosity $\eta_W$ of the aqueous emulsifier solution is preferably less than or equal to 150, more preferably less than or equal to 100, and typically preferably less than or equal to 60, wherein the viscosity $\eta_O$ means the viscosity of the biodegradable polyester at a temperature 30° C. higher than the melt temperature (Tm) of the biodegradable polyester; and the viscosity $\eta_W$ means the viscosity of the aqueous emulsifier solution at a temperature of 80° C. A ratio $\eta_O/\eta_W$ out of this range may invite coarse particles in large amounts, separation of the solid phase and the aqueous phase, or W/O emulsions or solids at ambient temperature, and thereby target products are not obtained in many cases. To control the viscosities to satisfy the above specified condition, the biodegradable polyester can further comprise a plasticizer or the aqueous emulsifier solution can further comprise a thickener.

The amount of the emulsifier is preferably more than 5% by weight, for example from 6 to 25% by weight, relative to the biodegradable polyester.

The biodegradable polyester must be melted and the aqueous emulsifier solution must be prepared before performing the method of the present invention. The aqueous emulsifier solution can be prepared according to a regular dissolution procedure, and the melting of the biodegradable polyester will be illustrated below.

The biodegradable polyester is melted by heating to a temperature higher than its melting point. The melting is generally performed at a temperature higher than the melting point by 10° C. or more using a drum, an emulsification equipment or an extruder. The volatile content of the melt is preferably less than or equal to 0.3%. If the volatile content exceeds 0.3%, the molten biodegradable polyester yields foams upon mixing with the aqueous emulsifier solution, and the resulting mixture is not sufficiently sheared and milled to cause coarse particles.

Next, mixing of the molten biodegradable polyester (the biodegradable polyester melt) and the aqueous emulsifier solution, more specifically, dispersion of the former into the latter will be illustrated. The dispersion is believed to occur in the following manner. Initially, a W/O disperse system comprising the molten biodegradable polyester as a continuous phase and the aqueous emulsifier solution as a disperse phase is formed at early stages of dispersion. Next, phase inversion occurs after continuous kneading to yield an O/W dispersion system comprising the aqueous emulsifier solution as a continuous phase and the biodegradable polyester as a disperse phase. It has been observed that finer particles can be obtained with a steep viscosity-increase immediately before phase inversion. To increase the viscosity more steeply and to further extent, it is effective to finely disperse the aqueous phase component in the W/O dispersion system before phase inversion, which requires a large shearing force. Dispersion means to yield such a large shearing force as to finely divide the particles include, for example, homomixers, homogenizers, colloid mills, extruders, kneader-ruders, and agitators (dispersers) having modified helical blades for use in highly viscous liquids. Among them preferred are high-performance disperse that disperse an material by local mixing by means of a high-speed disperser and by rotation and revolution of a blade capable of equally agitating the whole material (hereinafter referred to as "high-performance dispersers"), corotating twin-screw extruders, grinder extruders, and other screw extruders.

In any dispersing apparatus, (i) the aqueous emulsifier solution is added to the molten biodegradable polyester with stirring, or (ii) the aqueous emulsifier solution and the molten biodegradable polyester are charged into the dispersing apparatus concurrently and are then agitated to start the mixing and dispersing process. The extruders can perform the procedure (i), and the high-performance dispersers can perform any of the procedures (i) and (ii).

For example, when a corotating twin screw extruder or grinder extruder is used, the biodegradable polyester is continuously fed to the extruder through its hopper, and separately the aqueous emulsifier solution is injected into the extruder through a supply port disposed at any position other than the point where the resin is melted. Then the biodegradable polyester is melted, is mixed and kneaded with the aqueous emulsifier solution, or is further mixed and kneaded with water at a temperature lower than or equal to 100° C. and thereby continuously yields an aqueous dispersion of the biodegradable polyester. In this procedure, two or more supply ports can be arranged according to necessity.

When a high-performance disperser is used, the biodegradable polyester is charged into the disperser, is heated and melted; the aqueous emulsifier solution is added to the molten biodegradable polyester with stirring in one installment or dropwise and thereby yield a target aqueous dispersion of the biodegradable polyester. When the biodegradable polyester has a melting point of equal to or higher than 100° C., the biodegradable polyester may further comprise a plasticizer to lower the melting point, or a pressure-tight apparatus is used. As a result, the mixing and dispersing procedure can be performed in the same manner as above.

The aqueous dispersion of biodegradable polyester prepared by the melt emulsification may have a solid concentration of from 40% to 65% by weight, preferably from 50% to 65% by weight, and more preferably from 55% to 65% by weight, and a viscosity at 20° C. of from $10^3$ mPa·s to $10^4$ mPa·s, preferably from 1500 mPa·s to $10^4$ mPa·s, and more preferably from 2000 mPa·s to $10^4$ mPa·s. The solid concentration and viscosity can be appropriately determined according to the purpose of the aqueous dispersion, and the aqueous dispersion may be diluted where necessary. In the aqueous dispersion, the biodegradable polyester constitutes micron-to submicron-fine particles. The peak particle size is generally less than or equal to 10 μm, and preferably less than or equal to 5 μm and more preferably less than or equal to 3 μm, while depending on its intended purpose. Troubles induced by standing still, such as sedimentation of emulsion particles or separation of water, can be prevented by controlling the viscosity in consideration of the particle size. The aqueous dispersion has pH in the range of from 3 to 7 in many cases. When the aqueous dispersion is acidic with pH lower than 3 or is basic with pH higher than 7, standing conditions (temperature and time) must be carefully set to avoid hydrolysis.

The aqueous biodegradable polyester dispersions prepared according to the present invention can be formulated into compositions further comprising any of additives such as plasticizers, tackifiers, fillers, pigments, dispersion stabilizers, and chemical agents such as insecticides, pharmaceutical drugs and agricultural chemicals according to necessity. Such additives are incorporated into the aqueous dispersions by means of processes according to their forms, properties, and formulation amounts, as well as intended purposes of the resulting compositions. For example, pellets comprising the biodegradable polyester and the additives previously are previously prepared and are used; the additives are added to the melt phase and/or aqueous phase in any process step of the melt emulsification; or the additives are added to extruded products.

Promising fields by function in which the aqueous dispersions can be used in practice include, for example, adhesion, coating, sustained release, and forming or molding as excipients. When the biodegradable polyester as emulsion particles must be coalesced in practical use, means for coalescence, such as heating, pressurization, addition of solvents or plasticizers, are required. However, these means are not required when the aqueous dispersions are used in applications in which the particles coalesce with each other as a result of evaporation of water, such as in pressure sensitive adhesion.

The adhesion function (adhesion capability) means not only narrow definition of adhesion to bond wood, boards, cloths, and glass, but also includes capability of serving as adhesives in the broad sense of term. Such adhesives are used to bond organic materials such as wood pulp, staple fibers, wood pieces, leather chips, synthetic fibers, and synthetic webs; or inorganic materials such as rock wool, cement, white marble, asbestos, clay, porcelain clay, powders of metals, and metal oxides to form reinforced paper, pulp molds, nonwoven fabrics, artificial leather, inorganic fiber boards, and inorganic building boards. They are also used to impregnate paper, cloths and other materials to reinforce and toughen the materials to thereby yield book jackets, starched bed sheets, and starched shirts. When the aqueous dispersions are used in these applications, the resulting products are biodegradable, can be easily decomposed in a natural environment after discarded and thus do not invite environmental pollution caused by discarded articles. Moreover, when the aqueous dispersion is used as a heat sealing agent for paper, it can exhibit blocking resistance at high temperature and high humidity due to the crystallinity of the biodegradable polyester, can adhere in a short time, can be hydrolyzed and thus does not invite environmental pollution. The aqueous dispersion can thereby be used as a recyclable heat sealing agent.

The aqueous biodegradable polyester dispersions prepared according to the present invention can also be used in applications requiring coating function. Coating is performed for protection or for yielding good appearance by imparting resistance such as toughness, water resistance, light resistance, chemical resistance, and aging resistance. Coating is also performed to impart sustained release properties to fertilizers and chemical agents. A variety of resins have been used in these applications, but most of such resins remain without decomposition and thus cause environmental pollution. From this viewpoint, coating of the following materials is one of the optimum applications of the aqueous biodegradable polyester dispersions. Such coating procedures include, for example, coating of materials that can be decomposed in a natural environment, such as paper, wood and leather; coating of fertilizers, agricultural chemicals, pharmaceutical preparations, and other medicated materials that exhibit effects by being delivered in a minimum dose to a target site at a predetermined rate; and coating of submersible metals, concrete, and other materials for use in shipping and constructions in oceans and rivers so as to avoid adhesion of underwater creatures such as mussels and acorn shells. Final products of the aqueous dispersions are paints, inks, and other coatings. Articles to be coated with the coatings can be selected within broad ranges including paper, cloths, wood, plastics, cement products, concrete, metals, agricultural chemicals, insecticides, pharmaceutical preparations, and fertilizers. In addition, the aqueous dispersions can also be applied to the following use owing to the crystallinity of the constitutive biodegradable polyesters. Specifically, articles obtained by coating, adhesion or impregnation of the aqueous biodegradable polyester dispersions, such as felt, are placed in a mold, are molded by the application of heat and pressure and thereby yield, for example, caps and hats, nurse's caps, and lining boxes of containers. The articles are also dried and heated and thereby yield disposable resin gloves.

The aqueous biodegradable polyester dispersions prepared according to the present invention are applied to target points by using brushes, sprays, coaters, and other already available devices according to the purposes thereof. Where necessary, the coated articles are heated to a temperature equal to or higher than the melting point of the biodegradable polyester after application to complete coating. More specifically, such coating applications include, for example, wood coating, construction coating (building coating), antifouling coating, shipping coating, road marking coating, magnetic recording medium coating, and other painting applications in general senses; undercoating of recording paper, coated printing paper, printing art paper, moisture-proof paper, waterproof paper, water-repellent paper, release paper, and label paper; coating of paper, nonwoven fabrics, woven fabrics, and other materials for covering books; coating of shopping bags, paper bags, paper towels, and tissue paper; and coating of fertilizers, agricultural chemicals, and insecticides to yield sustained-release products.

The adhesion and coating procedures can be performed concurrently in practical use. For example, an absorber comprising wood pulp and an absorbing agent is sandwiched between the reinforced paper as a top sheet and a sheet coated with the aqueous biodegradable polyester dispersion as a back sheet. The resulting three layers are bonded using the aqueous biodegradable polyester dispersion and thereby yield diapers (nappies), sanitary napkins, and other products that can be converted into compost.

To utilize the sustained release property, a chemical agent is incorporated into the aqueous biodegradable polyester dispersion. In this case, the chemical agent is added to the biodegradable polyester in advance, is added to the melt or the aqueous emulsifier solution, or is added to the aqueous dispersion after its preparation. The resulting aqueous biodegradable polyester dispersion containing the chemical agent can be used as intact or by applying to paper, cloths, wood, leather, biodegradable plastics, and other biodegradable substrates. For example, products such as sustained-release agricultural chemicals, sustained-release fertilizers, and sustained-release and long-life anti-termite agents are spread as intact over soil. Aqueous dispersions containing pheromones and other insect pest control agents or antiinflammatory analgesic agents for neuralgia are applied to substrates such as paper, cloths, and biodegradable plastic films before practical use.

EXAMPLES

The present invention will be illustrated in further detail with reference to several examples; however these examples are intended to illustrate the invention and are not to be construed to limit the scope of the invention. All percentages are by weight unless otherwise specified.

Biodegradation Test: Biodegradation tests were performed according to the following method unless otherwise noted.

An aqueous dispersion was applied to wood free paper (70 g/m$^2$) using a #36 bar coater, was dried at 130° C. for 3 minutes and thereby yielded a test sample (3 cm wide, 5 cm long). The test sample was embedded in a test soil having a moisture content of 50% relative to the maximum water holding capacity, and a weight loss of the test sample at 25° C. was determined to determine the biodegradability. The test soil was soil (volcanic ash soil) of SDS Minori Farm, Yuki, Hadori, Minori-cho, Higashiibaraki-gun, Ibaraki, Japan. The weight ratio of the test sample to the test soil was 1:400.

Reference Example 1
Preparation of Emulsifier

A total of 5 kg of toluene and 1 kg of a biodegradable polyester (poly(butylene succinate); number average molecular weight: 10000; hydroxyl value: 5.6) were charged into a 10-L cylindrical separable stainless steel reactor equipped with a stirrer, thermometer, dropping funnel, sidearm reflux condenser, and nitrogen gas supply port. The mixture in the flask was heated to 110° C. with stirring under flow of nitrogen gas to thereby remove water from the reaction system under reflux. After completion of removal of water 30 minutes into refluxing, the mixture in the flask was cooled to 80° C. and was further stirred and treated with 320 g of hexamethylene diisocyanate added all at once from the dropping funnel. Two hours later the mixture was further treated with 6 g of dibutyldilauroyloxystannane and was stirred for further three hours. Next, the inside pressure of the flask was reduced to thereby remove unreacted hexamethylene diisocyanate. The mixture was further treated with 440 g of a solid polyethylene oxide having a molecular weight of 2200 and was stirred at a constant temperature of 80° C. for further five hours in the same manner as above, followed by removal of toluene by distillation under reduced pressure. The mixture was then dissolved in 6.4 kg of water homogeneously and was cooled to room temperature. The reaction product was a viscous solution having a number average molecular weight in terms of solid contents of 15000 and a solid concentration of 20.1%. A 1% aqueous solution prepared from the reaction product had a surface tension of 45.3 mN/m.

Reference Example 2
Preparation of Emulsion by Solution-Phase-Inversion

To a 1-L separable flask without lid were charged 250 g of 20% toluene solution of a polycaprolactone (available from Daicel Chemical Industries, Ltd. under the trade name of Celgreen PH-4) and subsequently 135 g of 15% aqueous solution of a poly(vinyl alcohol) (available from Kuraray Co., Ltd. under the trade name of KURARAY POVAL 220EG). A high-speed homomixer (available from Tokushu Kika Kogyo Co., Ltd. under the trade name of T. K. Homomixer HU-M) was placed in the flask, and the mixture was stirred at 5000 rpm for 15 minutes. The mixture was diluted with 288 g of ion exchange water (diluent water) added over 5 minutes to increase fluidity and was stirred for further 10 minutes and thereby yielded an emulsion containing toluene. Toluene was then removed from the product by distillation under reduced pressure to yield an emulsion. The emulsion had a peak particle size of 1.16 μm, a solid concentration of 16.9%, and a viscosity of 65 mPa·s.

Solid Concentration: The emulsion was dried at 105° C. for 2 hours, and the solid concentration was defined as the residue on evaporation (%) obtained in this procedure.

Viscosity of Molten Biodegradable Polyester: The relationship between shear rate and viscosity was determined as a graph using a capillary rheometer (viscometer) CAPIROGRAPH 1B (available from Toyo Seiki Seisaku-Sho, Ltd.), and a viscosity at a shear rate of $10^3$ $s^{-1}$ (emulsification condition in the examples) was determined by reading the graph and was defined as $\eta_O$. The measuring temperatures were described in the examples.

Viscosities of Aqueous Emulsifier Solution and Emulsion: A viscosity at 10 rpm was determined using a B type viscometer (available from Tokimec Inc. under the trade name of Model BH or Model BM). Alternatively, the relationship between the number of revolutions and the viscosity was determined as a graph, and a viscosity at 10 rpm was determined by reading the graph. In this procedure, the viscosity at 10 rpm was defined as $\eta_W$.

Melt Flow Rate (MFR): The melt flow rate (MFR) was determined at 190° C. (preheating 6 minutes) under a load of 2.16 kg using MELT FLOW INDEX TESTER (available from Yasuda Seiki Seisakusho Co., Ltd.).

Peak Particle Size: A particle size distribution curve was determined by a dynamic light scattering method using an analyzer (Microtrac Particle Size Analyzer FRA available from Microtrac Inc.(Leeds & Northrup)), and the peak particle size was defined as the particle size corresponding to the maximum frequency in the particle size distribution curve.

Example 1

Pellets of a poly(butylene succinate) were continuously fed at a rate of 10 kg/h from a hopper to a corotating twin-screw kneader extruder. Concurrently, 15% aqueous solution of a partially saponified poly(vinyl alcohol) was continuously injected at a constant temperature of 80° C. and a flow rate of 14 kg/h from an aqueous emulsifier solution supply port of the extruder disposed in a cylinder unit at fourth block from the hopper port using a plunger pump. The resulting mixture was continuously extruded. The poly (butylene succinate) was a non-chain-extended product of Showa Highpolymer Co., Ltd. under the trade name of BIONOLLE 1040 and had a $T_m$ of 115° C. and a MFR of 46.5. The extruder was a product of JSW under the trade name of SUPERTEX 44αII and had a cylinder diameter of 47 mm, was deep grooved and had an L/D ratio of 52.5. The partially saponified poly(vinyl alcohol) was a product of Kuraray Co., Ltd. under the trade name of KURARAY POVAL 220EG and had an average molecular weight of 98080 and a surface tension in terms of 1% aqueous solution at 20° C. of 52.0 mN/m. The temperatures in the cylinder were set at 50° C. in a resin pellet supply portion, at 155° C. in a resin melting portion, and at 100° C. between the emulsifier aqueous solution supply portion to the outlet. The viscosity $\eta_O$ of the resin pellets was 13000 mPa·s at 145° C., the viscosity $\eta_W$ of the emulsifier aqueous solution was 1800 mPa·s at 80° C., and the ratio $\eta_O/\eta_W$ of $\eta_O$ to $\eta_W$ was 7.2. The product was viscous and milky white, and electric conductance revealed that it was an emulsion having an aqueous phase as a continuous phase. The emulsion cooled to room temperature had a peak particle size of 1.79 μm, a solid concentration of 57.8%, and a viscosity at 20° C. of 183200 mPa·s and exhibited good shelf stability. The emulsion showed a decomposition rate of 70% (35 days) in the biodegradation test.

Example 2

Pellets of a poly(butylene succinate adipate) were continuously fed at a rate of 40 kg/h through a hopper into a corotating twin-screw extruder. Concurrently, 15% aqueous solution of a partially saponified poly(vinyl alcohol) was injected at a constant temperature of 80° C. and a flow rate of 18 kg/h using a plunger pump from an aqueous emulsifier solution supply port disposed in a cylinder unit at the fourth block from the hopper port. In addition, water held at 80° C. was injected into the extruder through a supply port disposed in the cylinder unit at eight block distance at a flow rate of 22 kg/h using a plunger pump. The resulting mixture was continuously extruded and emulsified. In this procedure, the poly(butylene succinate adipate) was a product of Showa Highpolymer Co., Ltd. under the trade name of BIONOLLE #3050 and had a $T_m$ of 95° C. and a MFR of 80. The extruder was a product of JSW under the trade name of SUPERTEX XCT and had a cylinder diameter of 69 mm and an L/D ratio of 42. The partially saponified poly(vinyl alcohol) was a product of Kuraray Co., Ltd. under the trade name of KURARAY POVAL 220EG and was the same as in Example 1. The temperatures in the cylinder were set at 50° C. in the hopper portion, at 140° C. in a resin melting portion, and at 100° C. between the emulsifier aqueous solution supply portion to the outlet. The viscosity $\eta_O$ of the resin pellets was 50000 mPa·s at 125° C., the viscosity $\eta_W$ of the emulsifier aqueous solution was 1800 mPa·s, and the ratio $\eta_O/\eta_W$ was 27.8. The product was an emulsion having a peak particle size of 1.64 μm, a solid concentration of 56.3%, and a viscosity at 20° C. of 6850 mPa·s and exhibiting good shelf stability. The emulsion showed a decomposition rate of 95% (35 days) in the biodegradation test.

Examples 3 to 5

Products were obtained by the procedure of Example 2, except that the biodegradable polyester and/or the emulsifier was changed. The details of these examples are shown in Table 1.

Example 6

Poly(lactic acid)emulsion having stable properties shown in Table 1 was obtained by the procedure of Example 2, except that a poly(lactic acid) was used as the biodegradable polyester. The poly(lactic acid) was prepared by dehydration condensation of a commercially available L-lactic acid as a 90% aqueous solution according to the following program (under the same conditions with those described in Example 2 of Japanese Unexamined Patent Application Publication No. 59-96123). The poly(lactic acid) had a $T_m$ of 160° C., but it flowed down too fast to determine its MFR. The resulting extrudate exhibited a decomposition rate of 85% (35 days) in biodegradation test in a compost at 58° C.

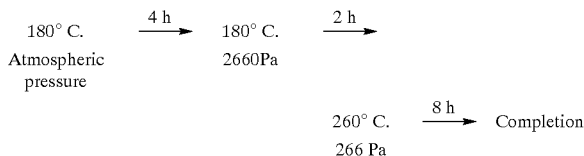

Example 7

Sebacic acid and 4-methyl-1,7-heptanediol in a molar ratio of the former to the latter of 1.00:1.05 were subjected to dehydration and subsequently to deglycolation and were further treated with hexamethylenediamine for chain extension and thereby yielded a biodegradable polyester having a number average molecular weight of 46300 and a $T_m$ of 32° C. However, the polymer flowed down too fast to determine its MFR. A total of 2 kg of the biodegradable polyester was charged into a high-performance disperser (a product of Tokushu Kika Kogyo Co., Ltd. under the trade name of T.K. HIVIS DISPER MIX 305) and was heated to an inside temperature of 80° C. To the stirred biodegradable polyester was added dropwise 50% aqueous solution (surface tension in terms of 1% aqueous solution at 20° C.: 56.4 mN/m) of a polyethylene oxide surfactant NOIGEN DS-601 (polyoxyethylene distearate, a product of Dai-ichi Kogyo Seiyaku Co., Ltd.) held at 80° C. At the time when 860 g of the surfactant was added, phase inversion occurred. In this procedure, the high-performance disperser was operated at a blade speed of 140 rpm and a disper speed of 10000 rpm. The mixture was cooled with 1600 g of ion exchange water and thereby yielded a product. The viscosity ratio $\eta_O/\eta_W$ was 57.0 ($\eta_O$: 4680 mPa·s, $\eta_W$: 82 mPa·s). The product was an emulsion having a peak particle size of 0.8 μm, a solid concentration of 54.5% and a viscosity of 12300 mPa·s at 20° C. and exhibiting good shelf stability. The product exhibited a decomposition rate of 80% (35 days) in the biodegradation test.

Examples 8 and 9

Emulsions were prepared by the procedure of Example 7, except that the biodegradable polyester and emulsifier were changed. The results are shown in Table 1. A polycaprolactone (available from Daicel Chemical Industries, Ltd. under the trade name of PLACCEL H-7; $T_m$: 60° C.; MFR: 129) was used in Example 8. A polymer was prepared by the procedure of the poly(lactic acid) of Example 6, except that equivalent moles of succinic acid, 1,4-butanediol, and dl-lactic acid were used in the presence of a catalyst tetrapropoxytitanium in an amount of 0.05% by weight relative to the monomers. This polymer was used in Example 9. The emulsions obtained in Examples 8 and 9 showed decomposition rates of 95% (35 days) and 70% (35 days), respectively, in the biodegradation test.

Example 10
Application Performance Evaluations 1

The emulsion obtained in Example 3 was applied to wood free paper using a 4-mil applicator and was dried at 110° C. for 3 minutes. The resulting coated paper was laminated with coating base paper by heat-sealing at 70° C. at 0.1 MPa for 2 seconds. After cooling to room temperature, the adherends were tried to peel off but the whole paper broke, indicating that they are satisfactorily bonded. The bonded paper showed a decomposition rate of 95% (35 days) in the biodegradation test.

Next, five pieces of the above-prepared bonded paper (5 cm wide, 5 cm long) were immersed in 500 g of tap water for 24 hours and were then stirred in a domestic juicing blender, where edges of blades were taken off by means of filing, for 5 minutes. The resulting mixture was put into water in a 1-L graduated cylinder to find that the paper disintegrated into pulp filaments, the adhesive was re-dispersed to make the aqueous phase turbid, and no cluster of the resin was observed. These results show that the emulsion obtained in Example 3 is an adhesive that is suitable for use in recycling base paper.

Example 11
Application Performance Evaluation 2

In a 500-ml flask were placed 30 g of a magnetic iron oxide (TAROX BF-2700), 1 g of 10% aqueous solution of sodium hexametaphosphate, 10 g of 10% aqueous solution of KURARAY POVAL S-2217, 59 g of water, and 150 g of glass beads; a disperser (available from Tokushu Kika Kogyo Co., Ltd. under the trade name of T.K. AUTO HOMO MIXER M) was attached to the flask to stir the mixture at 2000 rpm for 30 minutes. The mixture was further treated with 20 g of a poly(butylene succinate adipate) emulsion (the product of Example 2) by stirring at 200 rpm for 10 minutes, was then treated with 0.2 g of a plasticizer ADEKACIZER RS-107 (an adipic diester available from Asahi Denka Co., Ltd.) with stirring for further 30 minutes and thereby yielded a magnetic iron oxide slurry. The prepared slurry was applied to wood free paper for use in plain paper copier (PPC) (70.4 g/m²) using a 3-mil applicator, was dried at 110° C. for 3 minutes; the resulting magnetic film was oriented using a magnetic orientation device and thereby yielded a magnetic iron oxide-coated paper. The coated paper was tough and showed no change in a cellophane-tape peel test, a scratch test with the nail, and a wet rubbing test (rubbing 50 times with fingers while supplying water).

Comparative Examples 1 to 5

The extrusion procedure of Example 2 was repeated, except that biodegradable polyesters and emulsifiers shown in Table 1 were used, but stable emulsions were not obtained as indicated in "Product" in Table 1.

Comparative Example 6
Application Performance Evaluation 1

An emulsion was prepared by the procedure of Reference Example 2, except using the same polycaprolactone and emulsifier (KURARAY POVAL 220EG) as in Example 3. The thermocompression bonding procedure of paper of Example 10 was repeated, except using the above-prepared emulsion. After cooling to room temperature, the adherends were tried to peel off, and the resin layer was easily peeled off from the paper without any paper breakage.

TABLE 1

| | Biodegradable Polyester | | | Emulsifier | | | | | | | Peak particle size (μm) | Product | | | | | Biodegradation rate (%)/35 days |
|---|---|---|---|---|---|---|---|---|---|---|---|---|---|---|---|---|---|
| | Name | MFR (g/10 min) | $\eta_o$ | Name | $\gamma$ mN/m | Concentration (%) | $\eta_w$ | $\eta_o/\eta_w$ | | | | Solid concentration (%) | Viscosity (mPa·S) | Condition | Shelf stability | Apparatus | |
| Ex. 1 | PBS | 46.5 | 13000 | PVA (A) | 52.0 | 15 | 1800 | 7.2 | | | 1.16 | 57.8 | 183200 | Good | Good | Ext 1 | 70 |
| Ex. 2 | PBSA | 80 | 50000 | " | " | " | " | 27.8 | | | 1.79 | 56.3 | 6850 | Good | Good | Ext 2 | 95 |
| Ex. 3 | PCL | 23000 | PVA (B) | 60.1 | " | 750 | 30.7 | | | 3.27 | 56.9 | 3500 | Good | Good | " | 95 |
| Ex. 4 | PBSA | 80 | 50000 | " | " | " | " | 66.7 | | | 2.75 | 55.2 | 3270 | Good | Good | " | " |
| Ex. 5 | " | " | " | " | " | 13 | 395 | 126.5 | | | 2.75 | 52.9 | 1670 | Good | Good | " | " |
| Ex. 6 | PL | 4980 | " | " | 15 | 750 | 6.6 | | | 1.64 | 56.7 | 3480 | Good | Good | " | 85* |
| Ex. 7 | PHS | 4680 | NG | 56.4 | 50 | 82 | 54.5 | | | 0.8 | 54.5 | 12300 | Good | Good | Dmix | 80 |
| Ex. 8 | PCL | 23000 | CAS | 52.7 | 15 | 620 | 37.1 | | | 2.8 | 48.7 | 1120 | Good | Good | " | 95 |
| Ex. 9 | PBSL | 9610 | PS | 45.3 | 20.1 | 210 | 45.8 | | | 0.7 | 59.3 | 18800 | Good | Good | " | 70 |
| Com. Ex. 1 | PBSA | 80 | 50000 | PVA (C) | 66.8 | 15 | 2520 | 19.8 | | | — | — | — | Poor | — | Ext 2 | |
| Com. Ex. 2 | " | " | " | " | 67.5 | " | 5960 | 8.4 | | | — | — | — | Poor | — | " | |
| Com. Ex. 3 | " | " | " | PVA (D) | 60.1 | 12 | 250 | 200 | | | — | — | — | Fair | — | " | |
| Com. Ex. 4 | " | " | " | " | " | 11 | 180 | 278 | | | — | — | — | Fair | — | " | |
| Com. Ex. 5 | " | " | " | PVA (B) | " | 10 | 100 | 303 | | | — | — | — | Fair | — | " | |

*Tested in a compost at 58° C.
$\eta_o$: Viscosity of the molten biodegradable polyester immediately before mixing with the aqueous emulsifier solution
$\eta_w$: Viscosity of the aqueous emulsifier solution immediately before mixing with the biodegradable polyester
$\gamma$: Surface tension of 1% aqueous solution
Product condition;
Good: Stable emulsion
Fair: Emulsion containing large amounts of aggregates and coarse particles
Poor: Not emulsified and in the form of porridge or sherbet
Shelf stability; Good: No change after standing at room temperature for 3 months
Emulsifier;
PVA (A): KURARAY POVAL 220EG
PVA (B): KURARAY POVAL S-2217
NG: NOIGEN DS-601
PVA (C): KURARAY POVAL 117
PVA (D): KURARAY POVAL 124
CAS: Casein aqueous solution (pH 8.0, pH adjuster: aqueous ammonia; milk casein)
PS: Preparation according to Reference Example 1
Ext 1: Corotating twin-screw extruder (JSW, SUPERTEX αII 47)
Ext 2: Corotating twin-screw extruder (SUPERITEX 65XCT)
Dmix: High performance disperser
Biodegradable polyester;
PBS: Poly (butylene succinate)
PBSA: Poly (butylene succinate adipate)
PCL: Polycaprolactone
PL: Poly (lactic acid)
PHS: Polymer prepared from 4-methyl-1,7-heptanediol and sebacic acid
PBSL: Poly (butylene succinate lactate)

Comparative Example 7
Application Performance Evaluation 2

The emulsion obtained in Comparative Example 6 was inferior in heat-sealing property to the emulsion obtained in Example 10. Considering that this is partly because the resin permeated into the paper to an excessive extent, i.e., the thickness of the adhesive layer was not enough, an attempt was made to concentrate the emulsion obtained in Comparative Example 6 in the following manner. Initially, 300 g of the emulsion of Comparative Example 6 was placed in a 1-L balloon flask, and the flask was attached to a vacuum evaporator to concentrate the emulsion under reduced pressure. An attempt was made to distill off water by gradually reducing the vapor pressure in the flask while maintaining the outer bath at 70° C. to 75° C., but the emulsion vigorously foamed, and the vapor pressure was reduced only to 0.02 MPa to avoid excursion of the resulting foams into the receiver. In this procedure, water distilled off very slowly, and the foams remained to a further extent. This is probably because the viscosity of the emulsion increased with distillation. The concentration procedure was continued for 24 hours, and the resulting emulsion had a solid concentration of 20.3% and a viscosity of 625 mPa·s at 20° C. The emulsion lost 49.8 g of water by distillation. Using the prepared emulsion, a heat-sealing test was performed in the same manner as in Example 10. The adherends could be easily peeled off without any paper breakage.

Comparative Example 8
Application Performance Evaluation 3

Foaming occurred in the concentration procedure in Comparative Example 7, and the resulting emulsion had not been concentrated sufficiently due to the foaming troubles and thereby could not be bonded sufficiently by heat-sealing. These troubles may be partly caused by an excess proportion of the emulsifier KURARAY POVAL 220EG. Accordingly, in the following experiment, the proportion of the emulsifier KURARAY POVAL 220EG was reduced to a level equal to that in Example 3 and was subjected to solution phase inversion emulsification; toluene, and then water were distilled off from the product. These procedures were intended to yield an emulsion having a solid concentration of equal to or more than 40% or a viscosity of equal to or more than 1000 mPa·s at 20° C. as specified in the present invention and to examine the heat-sealing property of the emulsion. In this connection, the proportion of the emulsifier KURARAY POVAL 220EG relative to 100 parts by weight of the resin Celgreen PH-4 was 40.5 parts by weight in the emulsion obtained according to Reference Example 2 and used in Comparative Example 6 but was 6.75 parts by weight in the emulsion prepared according to Example 3 and used in Example 10. Considering this, the solution phase inversion emulsification procedure of Reference Example 2 was performed, except that the concentration of KURARAY POVAL 220EG in the aqueous solution was changed to 2.5% to satisfy the proportion of the emulsifier and that diluent water was not used since it was not necessary. The product contained large amounts of aggregates, and the aggregates emerged to separate the product into two phases. The aqueous phase as a lower layer was about one third of the whole volume of the product. An emulsion was obtained by distilling off toluene from the aqueous phase under reduced pressure and was found to have a solid concentration of 4.8% and a viscosity of 46.5 mPa·s at 20° C. Using the prepared emulsion, a heat-sealing test was performed by the procedure of Example 10, but the emulsion did not exhibit adhesion property as in Comparative Examples 6 and 7.

Industrial Applicability

The present invention can provide a method for producing an aqueous biodegradable polyester dispersion that has a high solid concentration and a high viscosity and is very advantageous in practical use.

What is claimed is:

1. A method for producing an aqueous biodegradable polyester dispersion, the method comprising the step of mixing and kneading a molten biodegradable polyester, an aqueous emulsifier solution having a surface tension in terms of 1.0% by weight aqueous solution at 20° C. of less than or equal to 63 mN/m, and other additives according to necessity to yield an aqueous dispersion having a solid concentration of equal to or more than 40% by weight and a viscosity at 20° C. of equal to or more than 1000 mPa·s.

2. The method for producing an aqueous biodegradable polyester dispersion according to claim 1, wherein the ratio $\eta_O/\eta_W$ of the viscosity $\eta_O$ of the molten biodegradable polyester to the viscosity $\eta_W$ of the aqueous emulsifier solution is less than or equal to 150.

3. The method for producing an aqueous biodegradable polyester dispersion according to claim 1 or 2, wherein the biodegradable polyester has the following constitutional repeating unit:

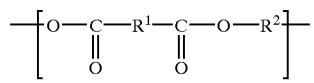

wherein $R^1$ and $R^2$ are each an alkylene group containing 2 to 10 carbon atoms or an alicyclic hydrocarbon group containing 5 or 6 carbon atoms.

4. The method for producing an aqueous biodegradable polyester dispersion according to claim 1 or 2, wherein the biodegradable polyester structurally comprises the constitutional repeating unit according to claim 3 being combined through at least the following unit:

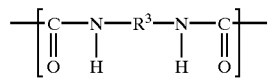

wherein $R^3$ is a diisocyanate residue,
and/or
the following unit:

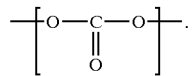

5. The method for producing an aqueous biodegradable polyester dispersion according to claim 1 or 2, wherein the biodegradable polyester structurally comprises the constitutional repeating unit according to claim 3 being combined through at least the following unit:

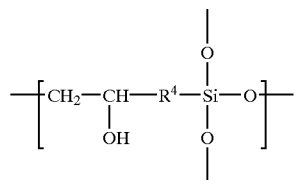

and/or
the following unit:

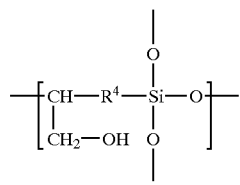

and/or
the following unit:

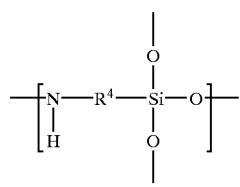

wherein $R^4$ is an alkylene group containing 2 to 6 carbon atoms.

6. The method for producing an aqueous biodegradable polyester dispersion according to claim 1 or 2, wherein the biodegradable polyester has the following constitutional repeating unit:

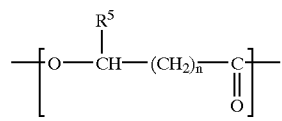

wherein $R^5$ is a hydrogen, an alkyl group containing 1 to 19 carbon atoms, or an alkenyl group containing 1 to 19 carbon atoms; and n is a number from 1 to about 4.

7. The method for producing an aqueous biodegradable polyester dispersion according to claim 1 or 2, wherein the biodegradable polyester structurally comprises the constitutional repeating unit according to claim 6 being combined through at least the following unit:

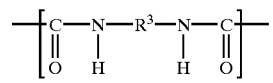

wherein $R^3$ is a diisocyanate residue;
and/or
the following unit:

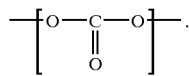

8. The method for producing an aqueous biodegradable polyester dispersion according to claim 1 or 2, wherein the biodegradable polyester structurally comprises the constitutional repeating unit according to claim 6 being combined through at least the following unit:

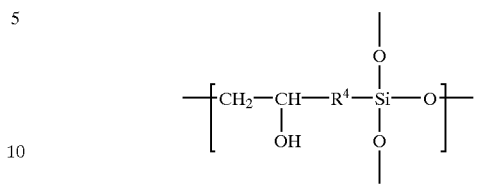

and/or
the following unit

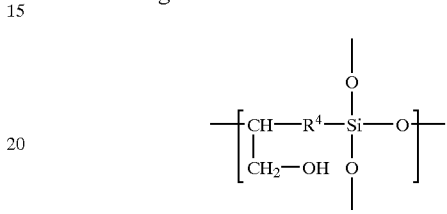

and/or
the following unit:

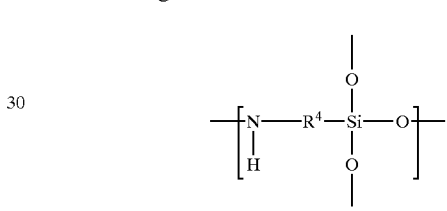

wherein $R^4$ is an alkylene group containing 2 to 6 carbon atoms.

9. The method for producing an aqueous biodegradable polyester dispersion according to claim 1, wherein the emulsifier is a poly(vinyl alcohol) or a nonionic surfactant having a polyoxyethylene chain.

10. The method for producing an aqueous biodegradable polyester dispersion according to claim 1, wherein a peak particle size is less than or equal to 3 µm, where the peak particle size is the diameter at a peak in a particle size distribution curve.

11. The method for producing an aqueous biodegradable polyester dispersion according to claim 1, wherein the step of mixing and kneading is performed using a screw extruder.

12. The method for producing an aqueous biodegradable polyester dispersion according to claim 11, wherein the screw extruder is a corotating twin-screw extruder or a grinder extruder.

13. The method for producing an aqueous biodegradable polyester dispersion according to claim 11 or claim 12, wherein the aqueous emulsifier solution is supplied separately at two or more points of the screw extruder.

* * * * *